United States Patent
Negley

(10) Patent No.: US 7,822,643 B2
(45) Date of Patent: Oct. 26, 2010

(54) PRESENTATION PRODUCTION SYSTEM

(75) Inventor: Mark S. Negley, Norwalk, CT (US)

(73) Assignee: LifeReel, Inc., Norwalk, CT (US)

( * ) Notice: Subject to any disclaimer, the term of this patent is extended or adjusted under 35 U.S.C. 154(b) by 711 days.

(21) Appl. No.: 11/272,180

(22) Filed: Nov. 10, 2005

(65) Prior Publication Data

US 2007/0106562 A1 May 10, 2007

(51) Int. Cl.
*G06Q 30/00* (2006.01)

(52) U.S. Cl. .............................. 705/26; 705/1; 705/10; 705/27; 705/500; 725/14; 348/465; 348/738; 348/E5.051; 348/E5.102

(58) Field of Classification Search ............... 705/26, 705/27, 10, 1, 500; 725/14; 348/465, 738; 348/E5.051, E5.102; 715/723
See application file for complete search history.

(56) References Cited

U.S. PATENT DOCUMENTS

| | | | | |
|---|---|---|---|---|
| 4,258,385 A | | 3/1981 | Greenberg et al. ............ | 358/22 |
| 5,740,388 A | * | 4/1998 | Hunt .......................... | 715/723 |
| 6,591,068 B1 | * | 7/2003 | Dietz ......................... | 396/429 |
| 6,809,762 B1 | * | 10/2004 | Donnelly et al. ......... | 348/231.7 |
| 7,203,380 B2 | * | 4/2007 | Chiu et al. ................. | 382/284 |
| 2002/0051077 A1 | * | 5/2002 | Liou et al. .................. | 348/465 |
| 2002/0053078 A1 | * | 5/2002 | Holtz et al. .................... | 725/14 |
| 2003/0206720 A1 | * | 11/2003 | Abecassis .................... | 386/83 |
| 2003/0236792 A1 | | 12/2003 | Mangerie et al. ............ | 707/100 |
| 2005/0050218 A1 | | 3/2005 | Sheldon ...................... | 709/231 |
| 2005/0209906 A1 | * | 9/2005 | Bayoumi et al. .............. | 705/10 |
| 2005/0268279 A1 | | 12/2005 | Paulsen et al. .............. | 717/110 |

OTHER PUBLICATIONS

Gray, Kate (Jun. 1985). Video Production Company Is Developing Into a Success. Dallas Business Journal,(2) 8(44), 4B. Retrieved Sep. 25, 2008, from ProQuest Central database. (Document ID: 5494097).*

International Search Report and Written Opinion of International Searching Authority completed on Feb. 11, 2007, 8 pages.

* cited by examiner

*Primary Examiner*—Yogesh C Garg
(74) *Attorney, Agent, or Firm*—St. Onge Steward Johnston & Reens LLC

(57) ABSTRACT

A fully customizable system and method for producing videos utilizing a "front-end" and/or a "two-step" decentralized business model for receiving input parameters from the customer or user and for presenting production elements for selection based on the input parameters. The system providing feedback by calculating total price, production time and required raw video source material as the customer or user makes production element selections. The customer or user is further provided with specific direction as to which and how many raw source materials are to be gathered for the video production.

18 Claims, 9 Drawing Sheets

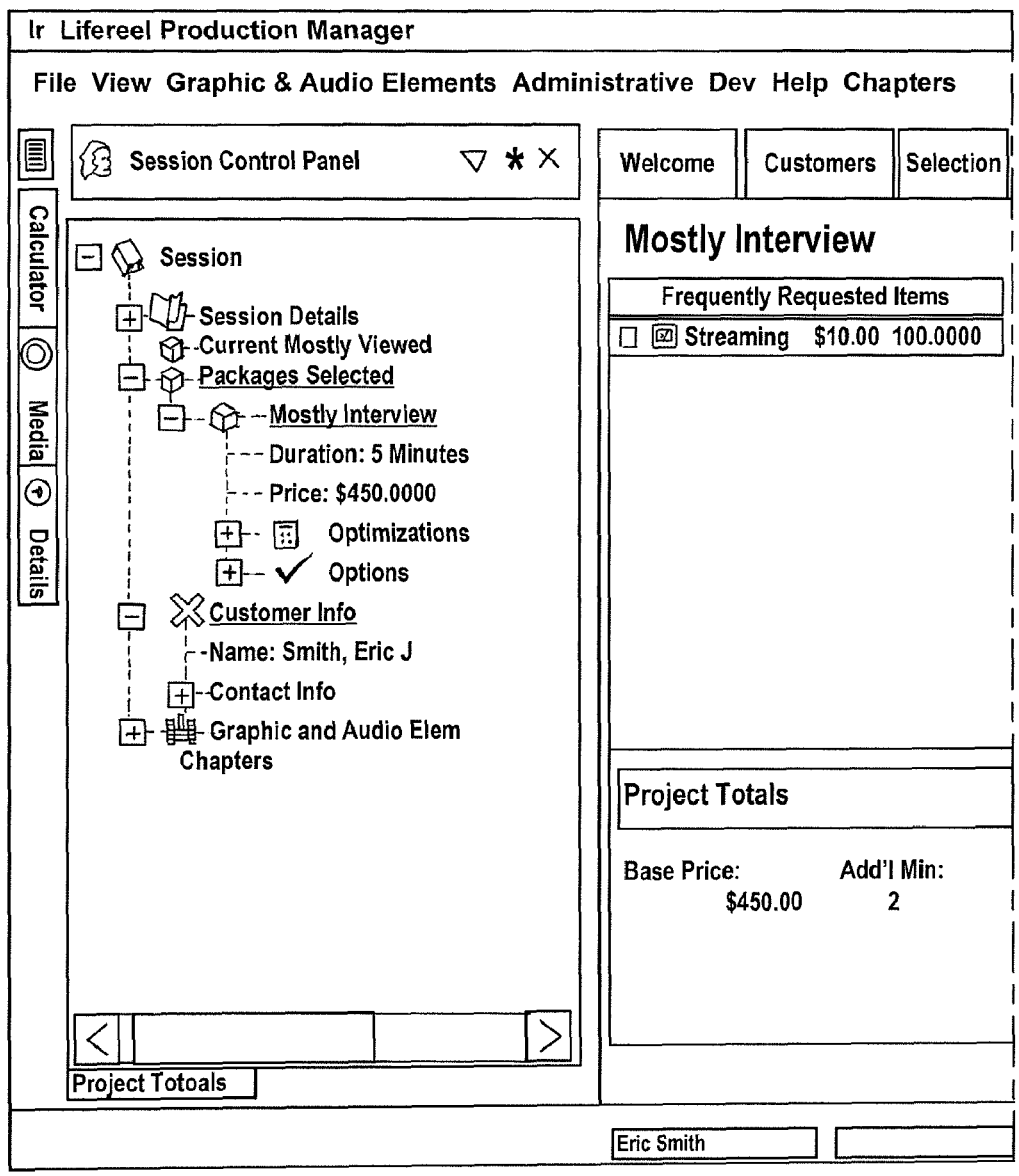
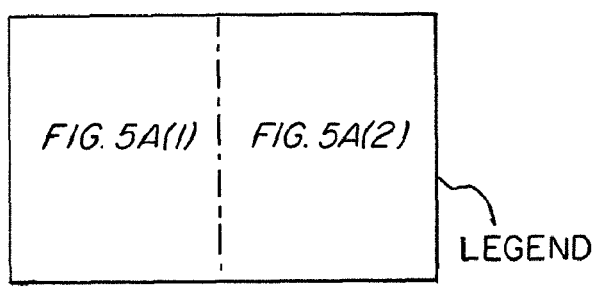
FIG.5A(1)

| | Included Items | | | | | | |
|---|---|---|---|---|---|---|---|
| | Item | Rec | U | Rat | Price | Ext'd | % |
| | Creative Consultation: Product | 1 | H | 0 | $0.00 | $0.00 | 0 |
| | Creative Consultation: Storyboard | 1 | H | 0 | $0.00 | $0.00 | 0 |
| | Music Library-Music Bed | 5 | m | 0 | $0.00 | $0.00 | 0 |
| | Digital Master | 1 | Q | 0 | $0.00 | $0.00 | 0 |
| | Copies: DVD | 2 | Q | 0 | $0.00 | $0.00 | 0 |
| | Graphics Package | 1 | Q | 0 | $0.00 | $0.00 | 0 |
| | In-Studio Production | 1 | m | 0 | $1.50 | $1.50 | 0 |
| | Makeup Studio | 1 | m | 0 | $10. | $10. | 0 |
| | Copies: VHS | 5 | Q | 0 | $5.00 | $25. | 0 |
| | Narration: Studio | 30 | m | 0 | $10. | $300. | 0 |
| | Phone Interview | 5 | m | 0 | $10. | $50. | 0 |

Tabs: OPTIONS | Graphic & Audio Elements | Chapter ID | Project Manager | Dev

Sidebar:
- Ir Media Transfer...
- Ir Media Transfer...
- Ir Media Transfer...
- Ir Minute Test
- Ir Misc Custom Pr
- Ir Music Library
- Ir Music Selection
- Ir Narration: Pro
- Ir Narration: Studio
- Ir Network Video...
- Ir Phone Interview
- Ir Post Production
- Ir Production edit...
- Ir Scanning:Photo
- Ir Story Teller Cost per Minute: $40.00
Add'l Minutes Cost: $40.00
Options $386.50

Total Project Cost: $916.50
Creative Consultation Fee: $100.00 (Paid)
Production Deposit: $408.25 (Due)
Amount Paid: $100.00
Balance Paid: $816.50

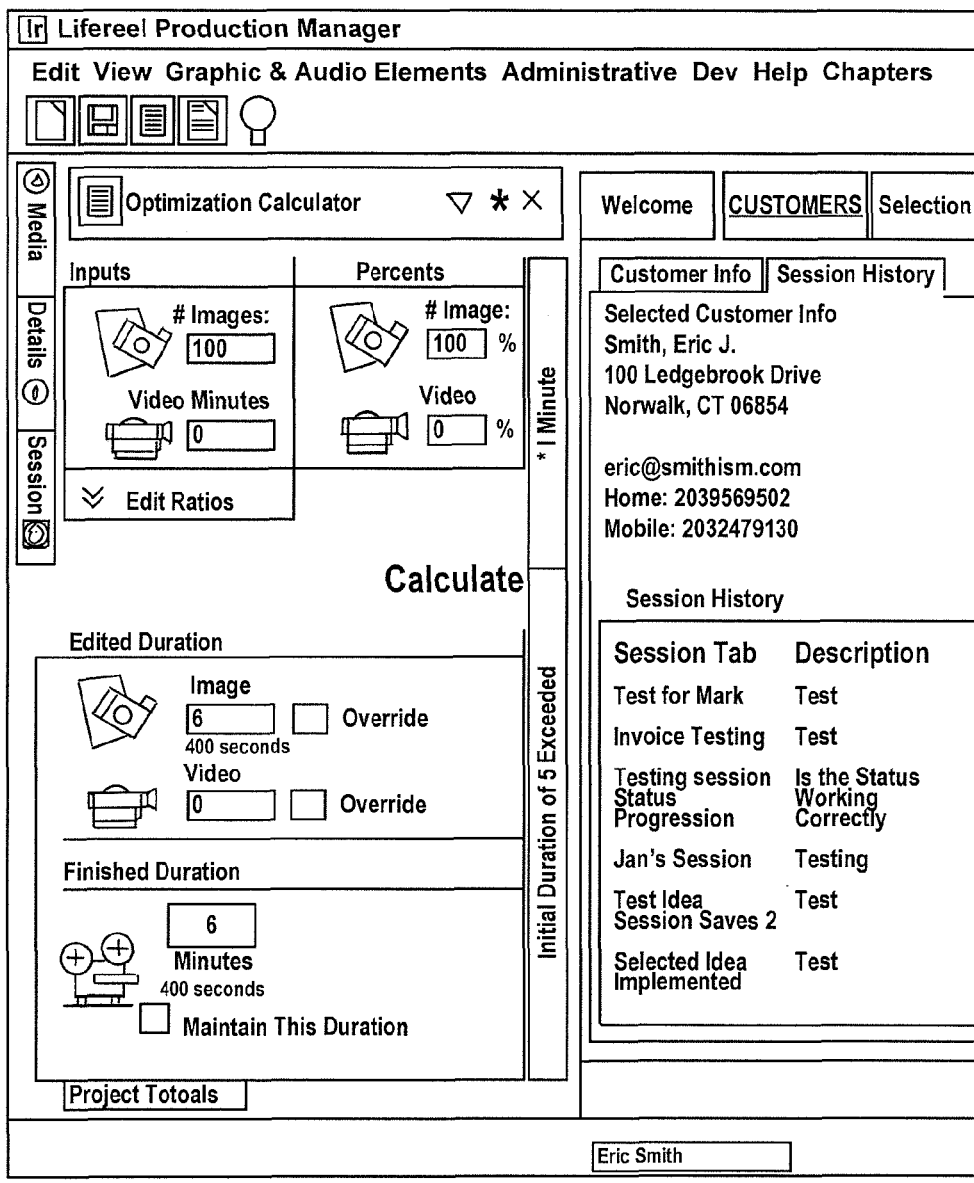
FIG.5B(1)
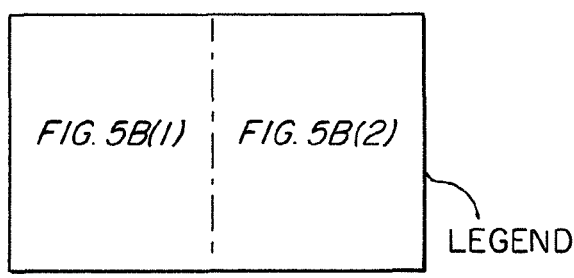
LEGEND

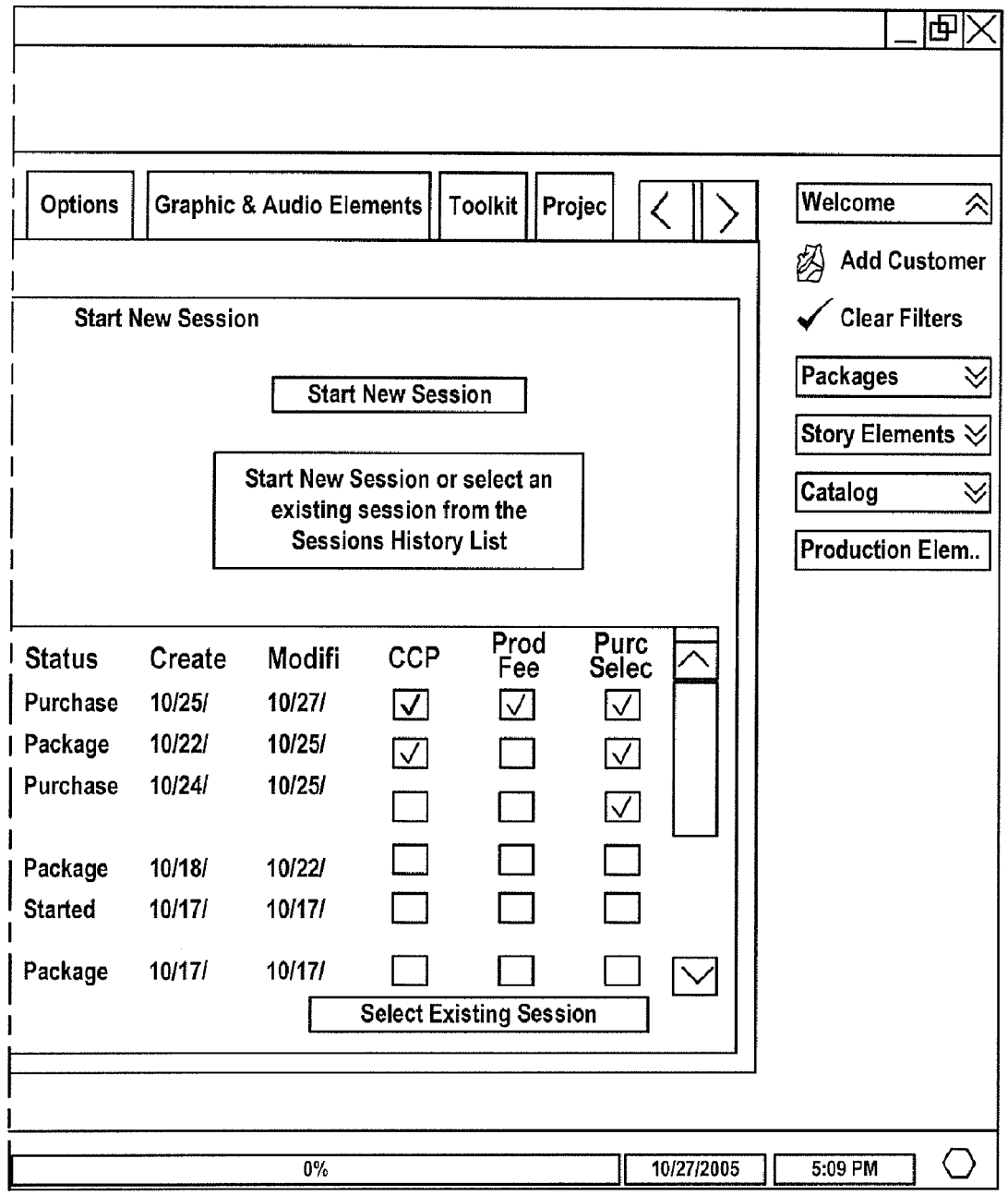
FIG.5B(2)

PRESENTATION PRODUCTION SYSTEM

FIELD OF THE INVENTION

The invention relates to a system and method for generating a video presentation, and more particularly to a fully customizable system and method for providing a third party operator and/or a customer the means to, at the outset of the project, control, the length of, for example, a video, total cost associated with production of the video, the various categories of information for use in the video, and the total raw source materials to be provided for video production.

BACKGROUND OF THE INVENTION

Video production has traditionally been a costly and cumbersome task. Individuals that desired to generate a video presentation, whether to tell for example, a life story, cover a special event or present a particularly compelling narration of events have had to spend many hours with little or no direction in gathering information and materials for the video.

Typically, an individual will determine that they want to have a video presentation produced for viewing at, for example, a wedding or an anniversary party, or as a video presentation produced to reflect the event itself. In furtherance thereof, raw source materials are gathered, such as for example, photos, video clips and/or other information to be used as source media materials in the video presentation. This raw source material is then, typically, brought into a video production center where a consultant/production manager may consult with the customer about video production. Upon receiving direction from the consultant/production manager, the customer then makes a number of decisions about the video, providing the consultant/production manager with a general idea of what is desired. This information along with the large amount of raw source material brought in is then given to the consultant/production manager, who sifts through, generates and edits the final video. This process may be described as a "back-end" type business and/or a linear business model. It is described as a back-end business because large amounts of raw source materials are first brought in, then decisions related to video production are made later. It is "linear" because this approach also requires the consultant/production manager to be engaged from project conception to completion. Back-end business and linear business models undesirable because they are quite labor intensive, have limited scalability and efficiency, and are correspondingly very costly for the customer.

In addition, back-end business models are inefficient, because even though the customer has brought in relatively large amounts of raw source materials, quite often specific additional application and contextual information must later be obtained after initial consultation with the consultant/production manager following the consultant/production managers review of the source material, requiring repeat consultations and leading to frustration on the part of the customer and numerous lost hours.

During this rather lengthy process, it is quite difficult to accurately estimate overall production costs, let alone production time, until the relatively large quantities of raw source materials are cataloged and reviewed to determine if additional material will be required. Therefore, a customer on a relatively tight budget or even under a relatively short time frame may again be quite frustrated with the costly nature of current back-end and linear business models and the lengthy time frame and uncertainty associated with current business models.

In addition, typically the consultant/production manager performs not only the function of guiding and consulting with the customer relating to the creative aspects of the video, but also performs the actual video editing work leading to higher costs passed to the customer. Additionally, the customer is frequently forced to do the pre-production work themselves or incur high production cost associated with this business model.

Further, the customer is typically limited to only one retail location where the particular consultant they have been using is located. This is because typically there is no Customer Relationship Management (CRM) network system in place, which can become very inconvenient for frequent business travelers.

Therefore, what is desired is a system and method for organizing and simplifying the process for video production so that the total costs associated with the video production may be reduced.

It is further desired to provide a system and method for generating a video presentation that provides a relatively accurate forecast relating to the total production time for the finished video.

It is still further desired to provide a system and method that provides increased direction for the customer to reduce the time and total quantity of raw source materials brought into the studio or production facility, for production of the video presentation.

It is also desired to provide a system and method that allows a customer to set the total price for and/or the total length of the final video presentation at the beginning of the video production process providing greater certainty for the customer.

It is further desired to provide a system and method that allows for the video presentation to be produced at a lower cost by limiting the time required by the consultant, who typically has a high hourly rate, for generation of the video presentation.

It is yet further desired to provide a system and method that includes a CRM, allowing more flexibility for the customer to meet with various consultants at various locations while maintaining efficiency.

SUMMARY OF THE INVENTION

These and other objects are achieved by system and method that may be described as a "front-end" and a "two-step" decentralized business model. "Front-end" because the customer initially consults with the consultant about the desired video presentation, and then at least some decisions related to video production are made prior to any existing raw source materials being gathered, or new source materials being produced. It is a "two-step" decentralized business model because it allows for the pre-production process to be accomplished in a first location and post-production to be accomplished in a second location. Once at least some of these decisions are made, then the customer is provided with a specific list of requirements and gathers raw source materials to fill that list. In this manner, less time is required to be spent with the consultant reviewing raw materials, who typically has a relative high hourly rate. Further, less time is spent gathering raw source materials because the customer is given specific directions regarding such, and less time is spent by the production manager in reviewing unnecessary and irrelevant source materials and in editing the final video product. All of this leads to lower overall costs born by the customer. In fact, because many of the decisions regarding the video are made in the pre-production process, the system may generate an invoice for the total video production cost even before any actual work is done providing a great deal of certainty for the customer.

Additionally, the total time required for production of the video may be accurately calculated due to the fact that many of the key video production decisions are made up front. This again, allows the customer to control the total cost of the project from the beginning and to set a time-table for completion of the project.

In one embodiment, the consultant meets with the customer to help guide the customer with the creative process. However, the consultant typically has a relatively high hourly rate. Therefore, it will lead to cost savings to limit the total amount of time required to be spent on the project by the consultant. Accordingly, once the customer and consultant determine exactly what raw source material is required, once this material is brought in to the consultant, it may easily be tagged or identified. The consultant may then generate an Edit Decision List (EDL) storyboard outlining in detail the specific sequencing and positioning of the raw source material. This EDL storyboard may then be provided to a production manager, who typically has a much lower hourly rate and can be located in a separate location, for generation of the final video presentation. In this manner, specialization of various tasks for generation of the video presentation is provided, leading to greater efficiency and lower costs.

It is also contemplated that the production manager may be located at a central editing location, which is remote from the retail location. A CRM system is provided that provides the production manager with all the data and information needed to generate the final video presentation. The CRM system also provides for greater flexibility and cost savings for the customer. This also allows for the customer to manage their project by visiting multiple retail locations.

The term "presentation" as used herein means data in a form perceptible to a user, whether visual, audio, tactile or otherwise, or any combination of these, including but not limited to, a finished video presentation.

The term "network" as used herein includes both networks and inter-networks of all kinds, including the Internet, and is not limited to any particular network or inter-network.

The terms "user" or "users" mean, a person or persons, respectively, who access data in any manner, for example, whether alone or in one or more groups, whether in the same or various places, and/or whether at the same time or at various different times.

It is contemplated that the system and method may utilize, for example, a computer system for presenting various pre-packaged offerings including various product categories, to the customer. Alternatively, it is further contemplated that the customer may freely choose from among various production elements and/or modify or combine and number of individual production elements and/or pre-packaged offerings. By initially setting a price, the customer may be presented with a variety of production elements. These may be altered and/or customized as desired. Once a number of production elements are selected, the customer may be presented with a total price, total production time, and a total amount of raw source material required for production of the video. The customer may accept the result or decide to further alter the selected production elements. By altering the production elements, the customer may, for example, lower or increase the total video length or price.

It is further contemplated that the customer may initially determine the total video length, in which case again various production elements will be presented to the customer to be selected from. The entire process is customizable allowing the customer to fully control the total cost, video length, production time, and specific theme and categories for the video. The system and method also reduce the frustration and time involved with obtaining the raw source materials required for the video because specific direction is provided to the customer up front rather than after the fact.

Once the customer decides that the selected production elements are satisfactory, the system may then generate a source materials check list or a tool kit for the customer. The check list is provided for the customer to help in the gathering of raw source material and instructions for producing new required raw source materials. For example, the customer may have selected a total of ten chapters for the video. The check list may be organized into these ten chapters, listing the required raw source material to be gathered or generated for each chapter. The customer may then gather or generate the raw source material as listed on the check list organized chapter by chapter.

Once the source materials on the check list are gathered, these may then be provided to the consultant, who may then, develop a comprehensive EDL storyboard pinpointing the specific sequencing, positioning and use of the source materials. The storyboard also includes all of the decisions made by the customer, such as, for example, the selected production elements and parameters.

This storyboard is provided to the production manager, who, may digitize the source materials provided and generate the video presentation based on the EDL storyboard. The entire process is therefore a "two-step" decentralized streamlining and lowering total cost for the customer and production time for the consultant and production manager further translating into a cost savings for the customer.

It is further contemplated that the customer may not, in one visit, be able to finish all the decisions relating to production element selection. Accordingly, any decisions previously made may be saved to a centrally accessible CRM system so that when the customer again has time to make further decisions, the session may simply be picked up where it was left. In this manner, the customer may visit various retail locations without having to redo previous decisions. For example, a customer may begin the process of selecting production elements at a retail establishment in Los Angeles, but does not have to complete the process. The session may then be saved and closed. The customer may then visit a retail establishment in for example, New York, where the session may again be opened and completed. This provides increased flexibility for the customer and increased efficiency as the process does not have to begin again when left off, even at a different retail establishment.

Once the decision-making process is completed, based on the above-listed example, either of the consultants in Los Angeles or New York, may generate the EDL storyboard, which may then be accessed by a production manager for generation of the video presentation.

While it is contemplated that a customer will interact with the consultant, at least initially, for aiding and guiding the customer through at least a portion of the decision making process, it is further contemplated that the system may be automated, such as with a kiosk system. The customer or user may visit a retail establishment and interface with a kiosk system that may guide the user through the various decisions related to the video production. The automated system may provide the user with full control of pricing, video length, category selection, and production time. Once the various elements are selected and accepted by the user, the automated system may then either generate a tool kit, or generate a document to present to an individual working at a retail establishment who could then provide the user with a tool kit. This particular feature allows the user to again reduce total costs as the amount of time spent with the creative consultant is drastically reduced or even eliminated altogether. The user may then complete the tool kit and provide it for the production manager's use as previously described.

In one advantageous embodiment, a video production system is provided comprising, a computer, and software for receiving a video input corresponding to a total video length, or a total video price, or combinations thereof. The software also displays a hierarchical listing of production elements for selection by a user. The software is further provided for processing the video length data and the selected production elements to determine video production characteristics selected from the group consisting of: total raw source video material needed, total production time, total production cost, and combinations thereof.

In another advantageous embodiment, a method of producing videos is provided comprising the steps of, identifying a user, displaying a session, and inputting information including, a video length, or a video price, or at least one category, or combinations thereof. The method further comprises the steps of, selecting production elements, determining video production characteristics selected from the group consisting of: total raw source video material needed, total production time, total production cost, and combinations thereof based upon the inputted information, and displaying video production characteristics to the user.

In still another advantageous embodiment, a method for producing videos is provided comprising the steps of, selecting a length of the video, presenting production elements in a hierarchical listing, and selecting from among the hierarchical listing production elements, certain production elements. The method further comprises the step of determining video production characteristics selected from the group consisting of: total raw source video material needed, total production time, total production cost, and combinations thereof based upon the selected length and production elements.

In yet another advantageous embodiment, a method for producing videos is provided comprising the steps of, selecting a price of the video, presenting production elements in a hierarchical listing, and selecting from among the hierarchical listing production elements, certain production elements. The method further comprises the step of determining video production characteristics selected from the group consisting of: total raw source video material needed, total production time, total production cost, and combinations thereof based upon the selected price and production elements.

In still another advantageous embodiment, a method for producing videos is provided comprising the steps of, selecting at least one product category for the video, presenting production elements in a hierarchical listing, and selecting from among the hierarchical listing production elements, certain production elements. The method further comprises the step of determining video production characteristics selected from the group consisting of: total raw source video material needed, total production time, total production cost, and combinations thereof based upon the selected at least one category and production elements.

In another advantageous embodiment, a method of sorting production data for generation of a video presentation is provided comprising the steps of, receiving data from a customer for generation of the video product, converting the data to a digital format, and storing the digitized data. The method further comprises the steps of, tagging the digitized data with an indicia to identify that particular data with a particular video presentation, and generating an EDL storyboard indicating where the tagged data is to be located in the video presentation. The method still further comprises the step of generating a video presentation with the tagged data and the EDL storyboard.

Other objects of the invention and its particular features and advantages will become more apparent from consideration of the following drawings and accompanying detailed description.

BRIEF DESCRIPTION OF THE DRAWINGS

FIG. 5A is a screen shot according to FIG. 1.

FIG. 5B is another screen shot according to FIG. 1.

DETAILED DESCRIPTION OF THE DRAWINGS

Figure 1:
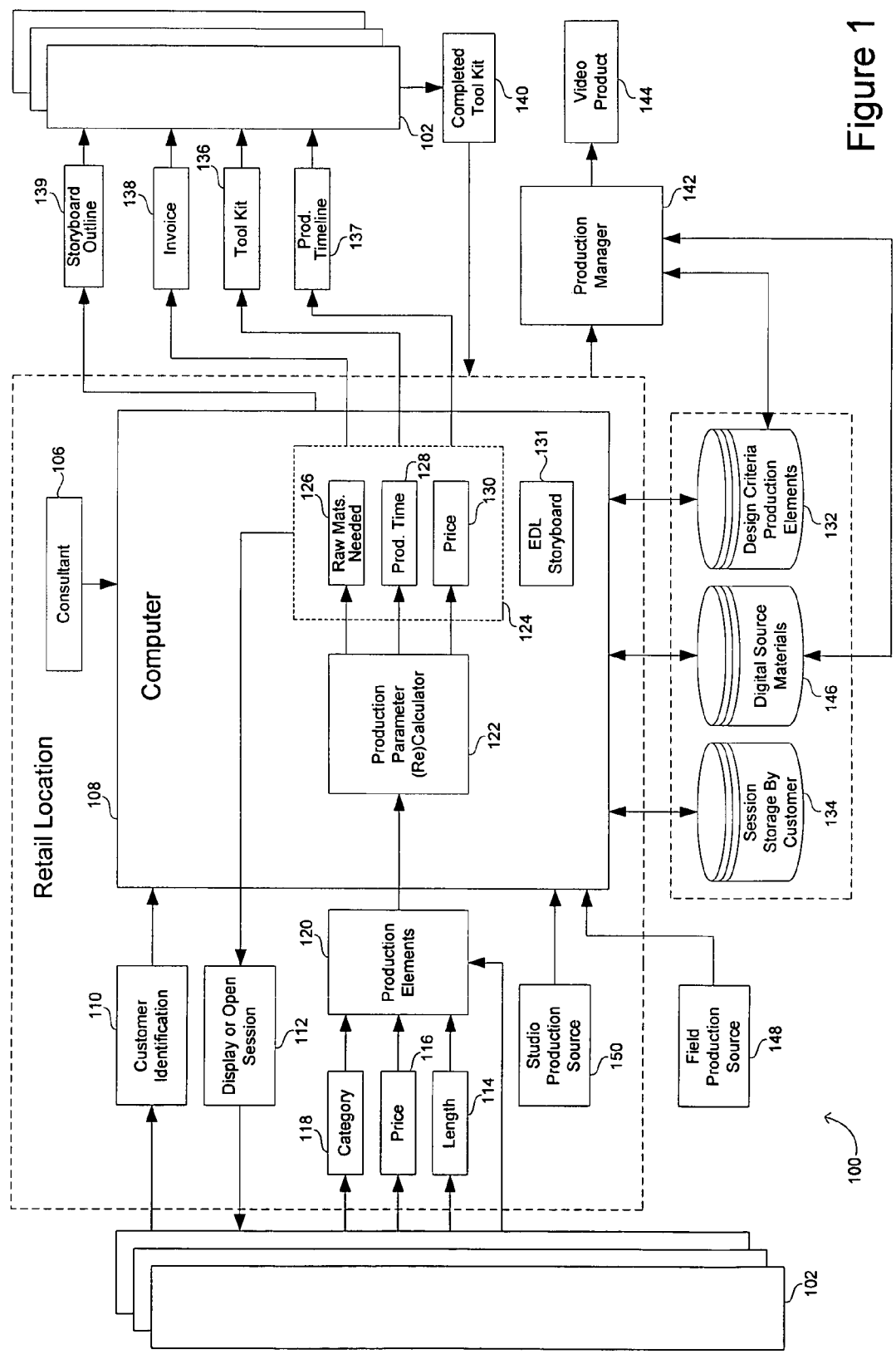
FIG. 1 is a block diagram of the system according to an advantageous embodiment of the present invention.

Referring now to the drawings, wherein like reference numerals designate corresponding structure throughout the views.

FIG. 1 depicts video production system 100. A customer(s) or user(s) 102 may visit a retail location 104 to consult with a creative consultant 106 for production of a video. The video may be directed to many different events, including for example, a life story of an individual, a story of a family, a story of an event such as a wedding or a trip, or virtually any story an individual would want to tell via a video presentation.

Typically a user 102 will go to a retail location 104 to begin the process. The creative consultant 106 may provide direction and input to user 102 in the planning and decision-making process for the video presentation.

Initially, if customer or user 102 is a new customer, creative consultant 106 can enter client information into computer 108, which may, for example, be connected to a network. Once this information is entered and user 102 is identified 110, computer 108 may open a session 112 in which user 102 may make decisions regarding the video.

User 102 has a number of options from the outset including, entering or inputting a desired video length 114, entering or inputting a desired price 116 or selecting a desired category 118. These features allow user 102 from the very beginning of the process to have full control. For example, user 102 may be on a relatively tight budget and total cost is an important factor to consider. Accordingly, user 102 may enter a total cost at the beginning that he/she is willing to pay. This decision in turn will limit the available options presented to user 102 such that the total price is kept within the initially entered budget price. So too, it may be very important that the total video length be set from the beginning. User 102 may input this information and will accordingly be presented with options to maintain this input parameter.

Various options user 102 may be presented with include, for example, but are not limited to selection of: categories, products, themes, packages, story-telling styles and production elements.

Alternatively, user 102 may want to move right to a particular category 118 the user 102 already having in mind a particular direction they wish to pursue with the video. Some examples of product categories and specific products may include for example, but are not limited to: tributes, memorial biographies, life stories, weddings, anniversaries, birthdays, vacation keepsakes, personal performances, video resumes, auditions, memories, and video greeting cards.

It should be noted that user 102 is presented with each of these input parameters (114, 116, 118), which may or may not be entered. In addition, user 102 may select any number of combinations of these options to further modify the options they will later be presented with.

Once user 102 has entered their desired input parameters or alternatively decides to by-pass these particular input parameters altogether, user 102 is presented with various production elements 120, which may then be selected. The user information and decisions made by the user as the session progresses may be variously stored in for example, storage 132, which will be discussed in connection with FIG. 2. Once user 102 has selected production elements 120, computer 108 by means of production parameter (re)calculator 122 performs a calculation based on the selected production elements 120. The calculation provides video production characteristics 124, which include the total raw video source material 126 required for the video production, the total production time 128 required for production of the video, and the total price 130. These video production characteristics 124 are displayed to user 102 so that upon review thereof, user 102 may either accept or alter the selected production elements 120.

While user 102 may initially input length 114 and price 116, user 102 will also have the option to select production elements 120 that may affect the total price or length of the video. In this manner, although user 102 may set an input parameter to, for example, a particular price, user 102 may then alter this parameter by selection of production elements 120. The total price 130 is however calculated by production parameter (re)calculator 122 so that user 102 is informed of how decisions affect, for example, the total price.

For this application, the term "production elements" may encompass a relatively large amount of information relating to video production and may include but is not limited to: digital and non-digital information, photographs, slides, video footage, movie reels, audio, interview footage, visual graphics, text style, special effects, make-up, field production, narration and scanning.

This process of selection and recalculation may be repeated any number of times until user 102 is satisfied with the selections and the video production characteristics 124. These various selections may be stored in storage 134, in which data or information relating to the identified customer may be stored for later retrieval and use.

Once all the decisions are made by the user 102 with the consultant 106 relating to the video presentation, consultant 106 may then proceed with generation of a comprehensive EDL storyboard 131, which pinpoints the specific sequencing, positioning and use of the source materials. This EDL storyboard 131 may be saved, for example, in storage 134 for later access by production manager 142. Alternatively, the EDL storyboard 131 may be generated at a later time one the raw source material has been identified and the total quantity is identified. Accordingly, as the source material is gathered and/or generated, consultant 106 has wide latitude to generate the EDL storyboard 131 at a time that accommodates user 102. This advantageously allows user 102 full control over the process.

Storage 132 and storage 134 are indicated outside of retail establishment 104 because it is contemplated that multiple retail establishments may effectively access this information via a network connection such as for example, the Internet, such that user 102 may visit virtually any retail establishment to consult with creative consultant 106 and retrieve an existing session saved on storage 134. This system may therefore comprise a Customer Relation Management (CRM) system that comprises a centrally accessible database of information relating to the particular customer or user 102. In this manner, greater flexibility is provided to user 102 who may visit many different retail locations and consult with different consultant without having to redo previous decisions.

Once the user data is stored, computer 108 may generate a check list or a tool kit 136, which may comprise a list of materials required for completion of the video. The user 102 may then gather and/or generate the materials listed on the check list or tool kit 136.

A completed tool kit 140, including all the source material required for generation of the video presentation, is then returned by user 102 to the retail location 104 for eventual generation of a video product 144. Tool kit 140 may be provided with multiple sections for maintaining various chapter materials in order. For instance, tool kit 140 may be organized by chapter so that user 102 simply needs to place the raw source materials required to generate that chapter into the corresponding slot in tool kit 140.

The raw source material may comprise any type of data or information used for production of video product 144, including but not limited to, video clips, pictures, audio clips, memorabilia that may be digitized, voice recordings, or any other data or information user 102 would like to include in the finished video product 144. This raw source material in completed tool kit 140 may then be provided to production manager 142, who may or may not be located at the retail establishment.

It is contemplated that the raw source material may, if it is already in digital form, be saved onto storage 146 from the retail location 104 indicated as field production source 148. Alternatively, the raw source material may be sent to production manager 142 to be digitized and saved on storage 146 indicated as studio production source 150. Organization of the digitized source material will be discussed in connection with FIG. 4. It should be noted that while studio production source 150 is shown located in retail establishment 104, it is contemplated that this digitizing of the raw source material may be accomplished at virtually any location by, for example, production manager 142 at a remote or centralized location.

Also generated by computer 108 is invoice 138, which corresponds to the total price 130, calculated by production parameter (re)calculator 122.

It is contemplated that a variable amount of time may be spent by user 102 with consultant 106. For example, it is certainly possible that user 102 may, from the beginning of the selection process, consult with consultant 106. While providing a superior end product, this process however, tends to increase the total cost of the project due to the expense of the creative consultant's time. It is therefore conceived that user 102 may alternatively begin the process via an automated process, such as by means of a kiosk system, be presented with the same input parameter choices and options. In this way, the total cost of production is reduced. Once the selections and decisions are completed, user 102 merely has to remove invoice 138 from computer 108 for a brief consultation with creative consultant 106 or even production manager 142 and is provided with tool kit 136. At the very least, user 102 may make a large amount of progress on selection of production elements 120 prior to seeing consultant 106, which in turn will further lower overall costs.

Computer 108 also generates production timeline 137, which provides user 102 with a timeline of information relating to dates for completion of certain projects related to the video production. For example, timeline 137 may include a scheduled date for interviewing a person, or taking a person(s) picture, and may further include dates for delivery of the raw source materials, dates for production and editing and delivery of the video product.

Additionally, computer 108 may generate storyboard outline 139, which may provide an outline of the presentation on a scene by scene and chapter by chapter basis, providing the customer with an expectation of what the final product will comprise.

Figure 2:
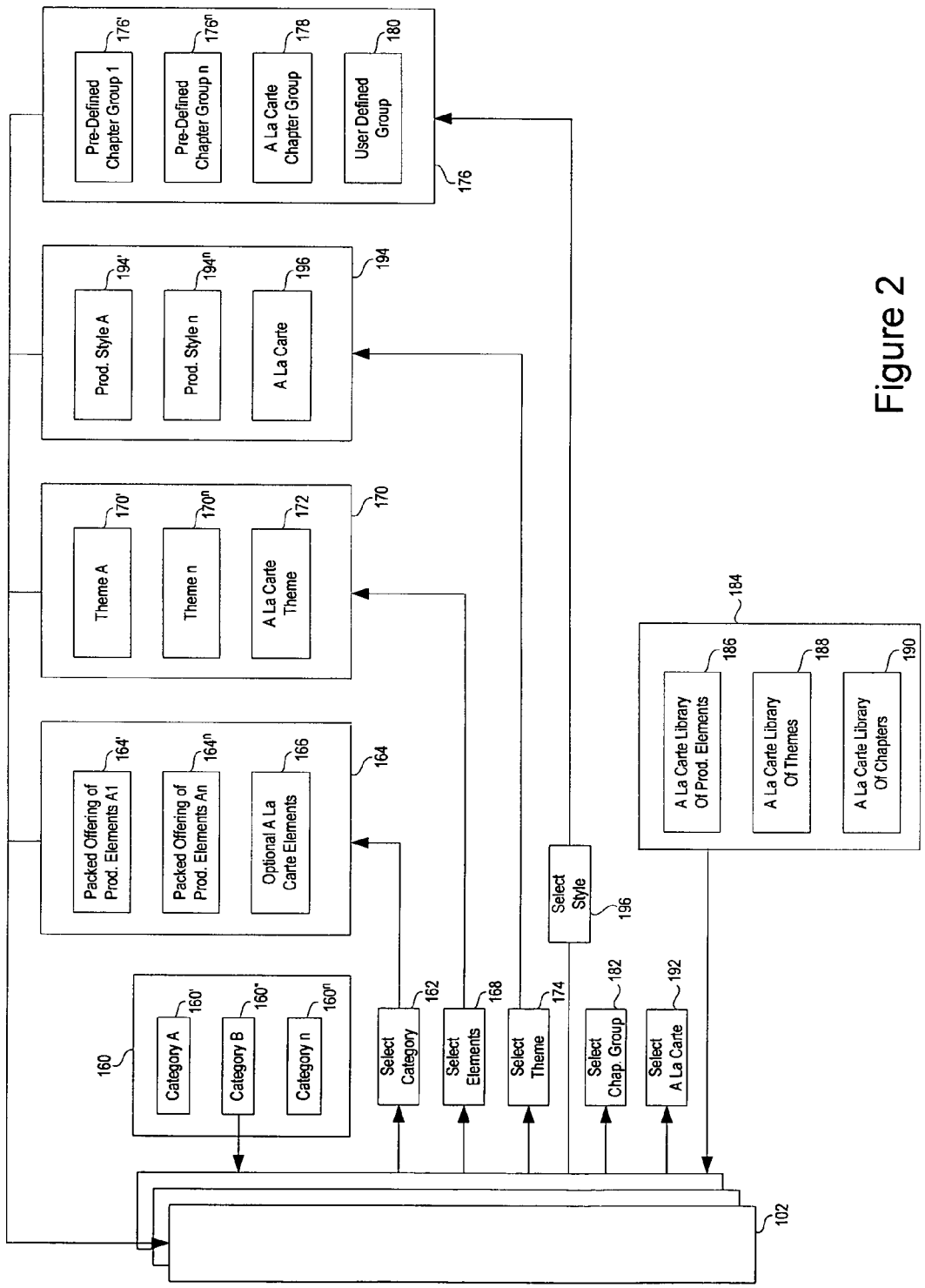
FIG. 2 is a block diagram according to FIG. 1 illustrating selection of production elements.

Referring now to FIG. 2, an illustration of the selection of various production elements 120. For example, user 102 may initially be presented with various categories 160 to choose from. For example, as illustrated in FIG. 2, user 102 may be presented with category A, 160', category B 160" through category n 160'''. It is contemplated that any number of various categories may be presented to or offered to user 102 to choose from. User 102 selects a category 162.

It should be noted that, the selection process is hierarchal in nature, meaning that each previous selection or decision limits the universe of available selections to next be offered. For example, once a category 160 is selected, user 102 may then be presented with various production elements 164. Some examples of these are illustrated in FIG. 2, where user 102 may be presented with packed offering of production elements A1 164' through packed offering of production elements A1 164" to choose from among. Again, virtually any number of packed offerings may be presented to user 102. It should be noted however, that user 102 is not required to select a packed offering, but may instead select optional a la carte elements 166. Additionally, user 102 may combine any number of a la carte features with any number of packaged offerings. In this manner, user 102 is afforded complete control over the production process. User 102 then selects elements 168.

Once these elements are selected, user 102 may be presented with a listing of themes 170. For example, as shown, user 102 may be presented with theme A 170' through theme n 170", indicating that almost any number of themes may be offered to user 102. In addition, user 102 may select an a la carte theme 172 and/or may combine selections as desired. User 102 then selects themes 174.

Upon selection of a theme(s), user 102 may be presented with a listing of production styles 194. For example, as illustrated, user 102 may be presented with production style A 194' through production style n 194", indicating that almost any number of production styles may be offered to user 102. In addition, user 102 may select an a la carte production style 196 and/or may combine selections as desired. User 102 then selects style 196.

Upon selection of a production style(s), user 102 may be presented with a listing of chapter groups 176. For example, user 102 may be presented with pre-defined chapter group 1 176' through pre-defined chapter group n 176", again indicating that virtually any number of pre-defined chapter groups may be presented to user 102. User 102 is also presented with the option to choose a la carte chapter groups 178 or even to utilize user defined groups 180 or any combinations as desired. In any event, user 102 is provided with complete control of the process allowing control not only of the content of the video product 144, but also allowing control over costs and production time. User 102 then selects a chapter group 182.

In addition to initially being presented with categories 160, user 102 may be presented with a listing of a la carte options 184. These may include any number of various items including, but not limited to, an a la carte library of production elements 186, an a la carte library of themes 188 and an a la carte library of chapters 190. Therefore, user 102 has the option to select 192 any number of a la carte features from the beginning of the process, or any at any time during the process.

It is understood that the selection of production elements 120 is an iterative process and many alterations and versions may be selected and reviewed prior to user 102 finally deciding upon a particular selections of production elements 120. These various versions may be saved in the same sessions or in various sessions. Computer 108 provides for saving of session version selections in storage 134 such that user 102 may try a number of differing categories, packaged offerings, themes, production styles and chapters each having a different look and feel prior to a final decision being made. This allows user 102 to truly pick and choose from among the vast array of production elements, allowing for example, a transition technique from one particular theme to be used in for example, a different one.

Figure 3:
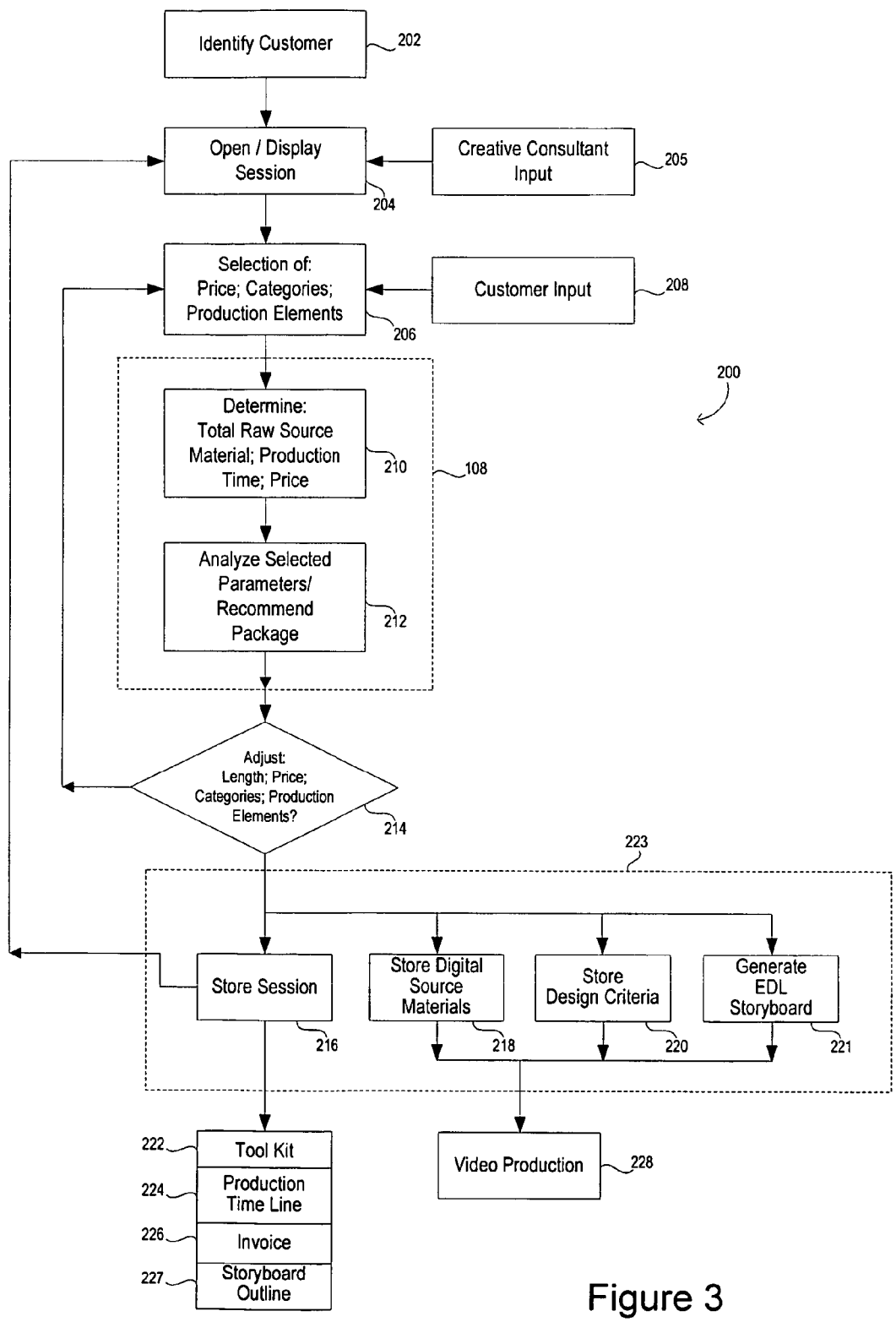
FIG. 3 is a flow diagram according to an advantageous embodiment of the present invention.

Referring now to FIG. 3, a flow diagram is provided illustrating a method for video production 200. Initially, a customer or user must be identified 202. Once identified, a session may then be opened and displayed 204 corresponding to the identified customer or user. This session will typically be opened or displayed by means of consultant input 205 who will typically have access to the system for the session.

The next step is the inputting of any input parameters and/or selection of production elements 206, which will be determined by the customer input 208 in conjunction with the consultant input. As previously mentioned, this may be an iterative process that allows the customer or user to fully customize the video as desired. Alternatively, the customer or user need not utilize a consultant, but rather, the method for video production 200 may utilize for example, a kiosk type system in which the customer or user responds to prompts or makes various selections of production elements presented or offered. This provides for a more automated system allowing the user to further control the total costs of video production. Still further, after the user has selected any desired production elements via the kiosk system, the user many then take their results to the creative consultant for input and adjustment. In any event, this allows users to fully control the video production process.

Once the customer or user has made selections, a determination is made, by computer 108, of the total raw source materials required, the production time required and the price 210. These video production characteristics are displayed or presented to the customer or user for reference.

As an optional step, the system may, for example, automatically analyze the input and selected parameters to determine and recommend a package 212 that most closely fits the selections. In this manner, the user is presented with, for example, a cost savings feature such that they are able to select a package for a particular price that may be lower than simply selecting the same features in an a la carte fashion. This feature may still further suggest certain upgrade packages that may be offered as a special at that particular time, or that closely fits the user's selected parameters. It should be noted however that the system still allows for full customization of the video, so that a customer or user may select a package and still add any number of additional selections thereto as desired.

The next step is to adjust length, price, categories or production elements 214. As previously mentioned, this is an iterative process. Once the customer or user is presented with, for example, the total calculated price for the video, the customer or user may decide that the selections are too expensive. Accordingly, the system allows for the customer or user to go back and deselect or adjust the selections to achieve the desired pricing for the video. The calculation is constantly updated as the customer or user adjusts selections allowing the customer or user to see how each decision affects the total cost, production time and raw materials required. The customer or user repeats this iterative process over and over until satisfied with the final video production characteristics.

Once satisfied with the selections the present session that was initially opened 204 may now be stored 216. In addition, various design criteria may also be stored 220.

The system 200 may then proceed to generate check list or tool kit 222, production timeline 224, storyboard outline 225, invoice 226 and storyboard outline 227. The tool kit may comprise, as above-described, a listing of various raw materials required for the video. The tool kit may further comprise, for example, an organizer such as a red-well with dividers therein for physically storing the raw source materials once gathered. In any event, the tool kit is designed to give the customer or user specific direction as to what to gather and how much of each particular item(s) need to be collected for video production.

The storyboard outline is a project outline defining scene by scene and chapter by chapter providing the customer with an expectation of what the final product will comprise.

The system 200 may also generate a production time line 224 for the user to see the time line for various scheduled dates related to the video production. Finally, an invoice 226 is generated for the user. The invoice will correspond to the calculated total cost generated by the system 200 and displayed to the customer or user. In this manner, prior to the actual generation of the video, the customer or user knows exactly how much the total costs will be.

Once the tool kit has been completed, the gathered and/or generated raw source material needs to be digitized as previously described herein, which digital source material is saved 218.

Based on the selected design criteria and consultation with the user, an EDL storyboard may be generated 221 by the consultant identifying and pinpointing the location and position of the various raw source materials for the video production. In this manner, the production manager may then, by means of a Customer Relationship Management (CRM) system 223, access the stored digital source materials 218 and the stored design criteria 220 and the generated storyboard 221, for production of the video product 228, which may be re-edited upon request by the customer.

It should be noted that, while various functions and methods have been described and presented in a sequence of steps, the sequence has been provided merely as an illustration of one advantageous embodiment, and that it is not necessary to perform these functions in the specific order illustrated. It is further contemplated that any of these steps may be moved and/or combined relative to any of the other steps. In addition, it is still further contemplated that it may be advantageous, depending upon the application, to utilize all or any portion of the functions described herein.

Figure 4:
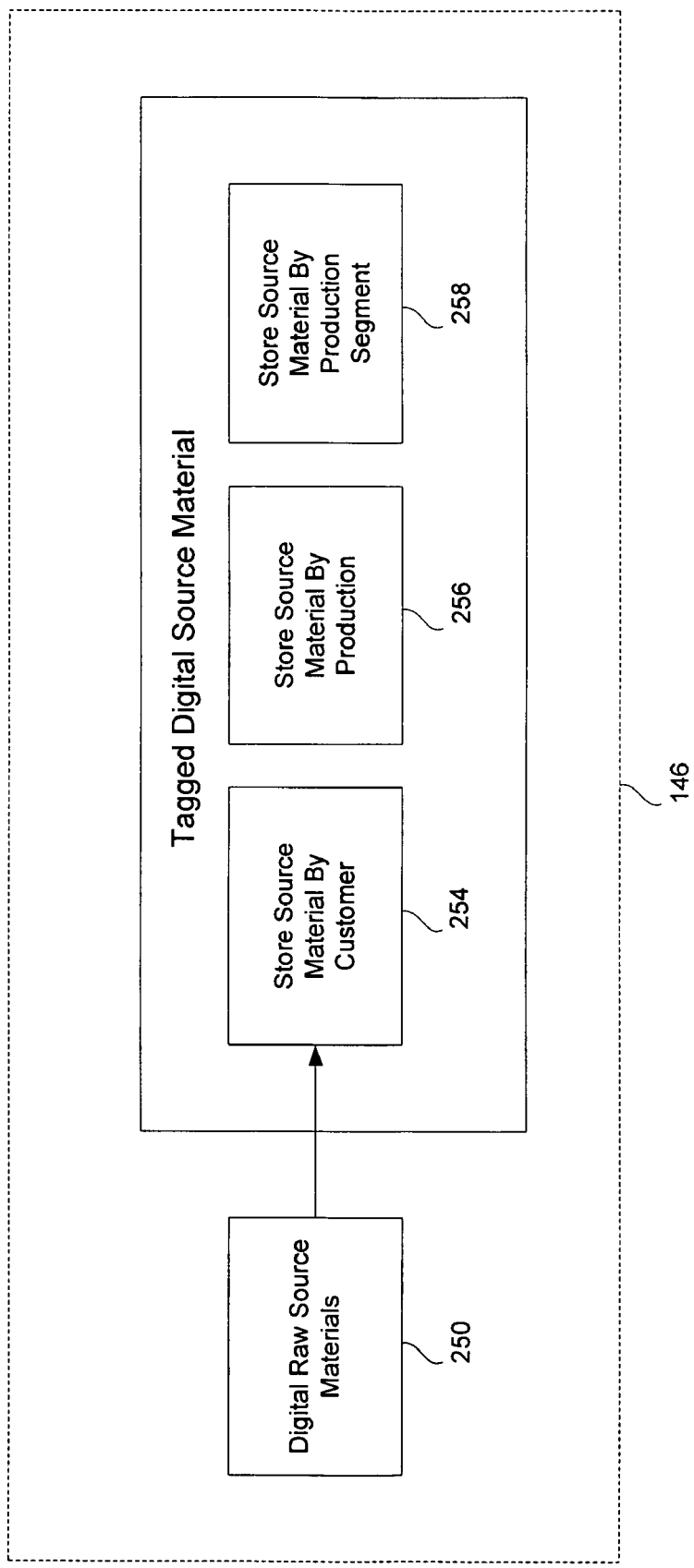
FIG. 4 is a block diagram according to FIG. 1 illustrating organization of digital source material.

FIG. 4 is an illustration of the digitized raw source material saved on storage 146. Digital raw source materials 250 may either be originally supplied to the consultant or production manager in a digitized form, or may require conversion to a digitized form. It is contemplated that the production manager can perform this function from the items supplied in the completed tool kit 140. In this manner, whether the items to be converted are still pictures, video, audio clips or even items of memorabilia, such as for example, a wedding invitation or an item obtained on a holiday, these may be converted to a digitized format for inclusion in the final video product.

The digitized source material 250 may then be converted into tagged digital source material 252. The tagged digital source material 252 may be organized and saved in many differing configurations, such as for example, stored by customer 254, stored by production 256 and/or stored by production segment 258. The production manager may be able to tag or identify digitized source material for location in the video product at least in part by the organization of the raw source material in the completed tool kit 140. Once tagged, the source material in conjunction with the EDL storyboard 131, may then be used to create the video product by any production manager, while the completed tool kit 140 with the original raw source material therein, may be returned to the user.

FIG. 5A is a screen shot of one advantageous embodiment of the present invention illustrating a number of offered and selected parameters. For example, in a window on the right hand side are listed "Included Items" which include items that have been selected. On the left hand side a widow lists "Frequently Requested Items", which may include at least some of the production elements being currently presented to the user. Items placed in the "Included Items" window, are color coded to reflect their status as included in the package, a customer requested item, or an A La Carte upgrade for easy identification. At the bottom the "Base Price" is listed along with any additional pricing that may include a la carte items or upgrades to a particular package. As various items are selected and/or deselected, the price and video length will continuously adjust and be presented to the user for visual reference. In this manner, the user can see how each selection will affect the overall price and video length. Various schemes may be saved in differing sessions so that the user may try various packages and configurations to compare cost and options. The process then is iterative, allowing the user full control as the beginning of the project to control the production characteristics.

FIG. 5B is a screen shot of another advantageous embodiment of the present invention. FIG. 5B illustrates the Session History frame combined with the Optimization Calculator functionality. The Session History comprises information regarding user 102, including for example, any previous decisions already made and stored on the system by means of the Customer Relationship Management system storage. It should be noted however, that while the Session History is here illustrated with the Optimization Calculator, either can be combined with or displayed with virtually any window or panel of the system including for example but not limited to, the Session Control Panel or the Frequently Requested Items panel or the Included Items panel.

Figure 6:
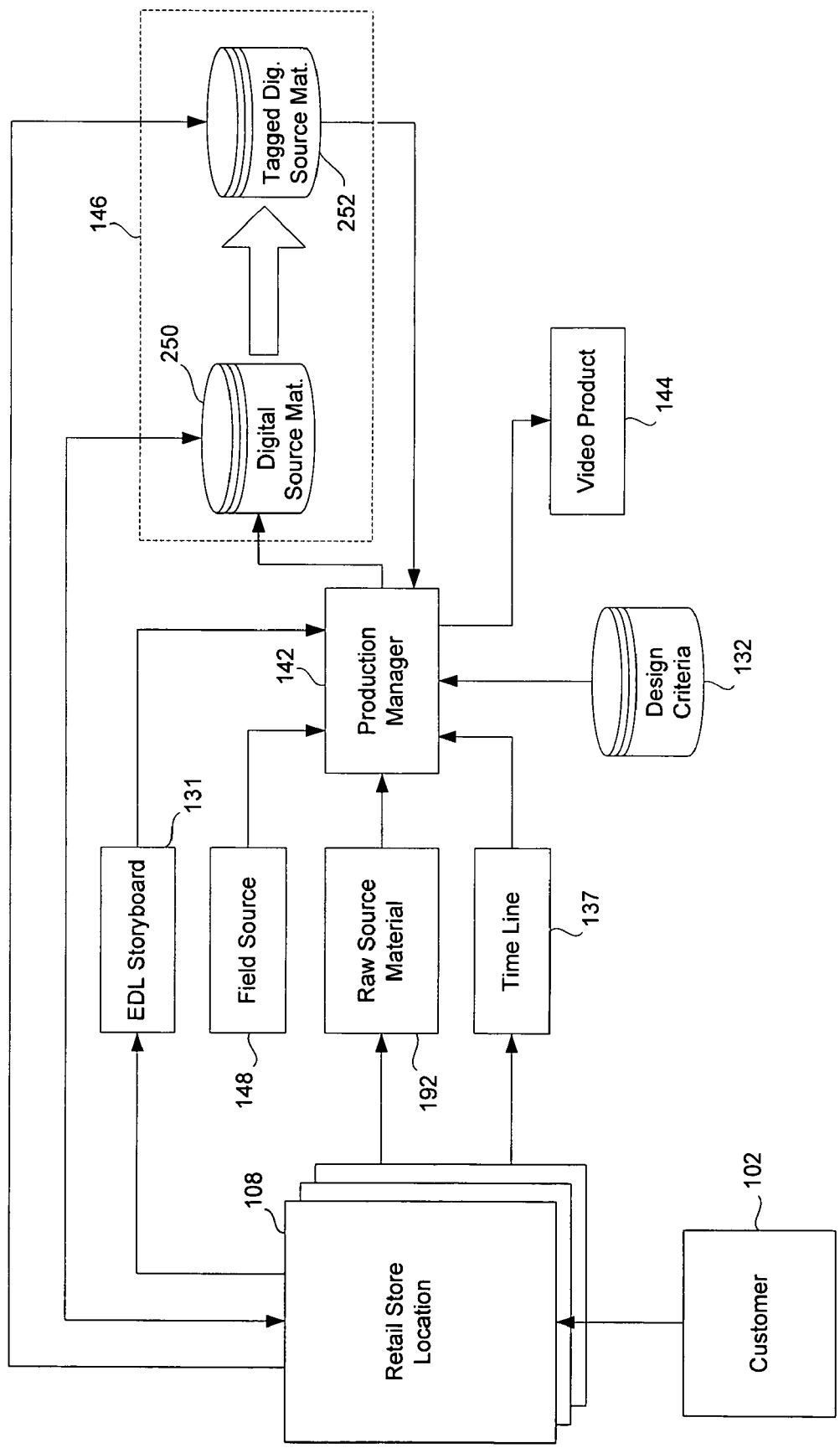
FIG. 6 is a block diagram according to FIG. 1 illustrating the manipulation of source material and video production.

Referring now to FIG. 6 illustrates a process the production manager 142 uses for producing video product 144. For example, the customer or user 102 brings the completed tool kit 140 to the retail location 108. The completed tool kit 140 may include the raw source material 192, which may have been gathered and/or generated by user 102. This raw source material may comprise any of the items previously described herein. Depending on the type of source material provided, it will either be entered into the system at the retail location, or will be sent to the production manager 142 for digital conversion into digital source material 250. Production manager 142 is able to access source materials 250 and may access field source materials 148.

Production manager 142 may, in one advantageous embodiment, be provided with timeline 137, which may include a timeline of production dates for scheduling and editing purposes. Having this information, production manager 142 may then digitize the source material creating tagged digital material as previously discussed herein, which is stored in storage 250. The digitized source material may then be accessed by the customer 102 with the consultant 106 at the retail location 108 where further decisions relating to the video production may be made. All of these decisions may be stored in storage 132 including design criteria and production elements.

Also provided to production manager 142 is EDL storyboard 131, which includes a detailed listing of the decisions, made by user 102 and the consultant 106. This EDL storyboard 131 allows the production manager 142 to position the tagged digitized source material to identify exactly where in the video the material is supposed to be placed. This may be an iterative process to determine the timing, location, transitions and use of all the digitized material. Once completed however, production manager 142 may then take the tagged material along with the EDL storyboard 131 and generate the video product 144. It should be noted however, that video product 144 may be further edited and adjusted as necessary for completion of the project.

It should be noted that, while various functions and methods have been described and presented in a sequence of steps, the sequence has been provided merely as an illustration of one advantageous embodiment, and that it is not necessary to perform these functions in the specific order illustrated. It is further contemplated that any of these steps may be moved and/or combined relative to any of the other steps. In addition, it is still further contemplated that it may be advantageous, depending upon the application, to utilize all or any portion of the functions described herein.

Many features have been described herein and the lists of, for example, production elements and/or categories, are not meant to be exhaustive, but merely illustrative. The systems and methods according to the present invention, however, allows for a front-end and two-step decentralized business model that greatly reduces the time and expense of video production because the customer or user is informed up front about and controls, the costs, time and materials needed for video production. This results in a high quality product at a reduced price.

Again, it is also contemplated that the process may include a fully staffed group of creative consultant and production managers to aide the customer or user at each step in the process. Alternatively, the method may be fully or even partially automated, thereby reducing costs and increasing efficiency of the video production.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A video production system for generating a video, the system comprising:
   a computer;
   software executing on said computer;
   said software receiving video data corresponding to a total video length, or a total video price, or raw source video materials available, or combinations thereof;
   said software displaying a hierarchical listing of production elements where a user selects one or more production elements from said hierarchical listing;
   said software processing the video data and the selected production elements and determining video production characteristics selected from the group consisting of: total raw source video material needed to make the video, total production time required to make the video, total length of the video, delivery date to the customer for the video, total production cost to make the video, total cost to the customer for the video, and/or combinations thereof;
   said software displaying at least one of said video production characteristics to the user.

2. The video production system according to claim 1 further displaying categories for selection by the user.

3. The video production system according to claim 1 wherein the user makes changes to the video and said software includes a production parameter recalculator which recalculates the video production characteristics based upon changes made to the video data.

4. The video production system according to claim 3 wherein the recalculated video production characteristics are displayed to the user.

5. The video production system according to claim 1 wherein when the system determines a total production cost, the system further generates an invoice based upon the determined total production cost.

6. The video production system according to claim 1 wherein the system generates a media tool kit according to the determined video production characteristics.

7. The video production system according to claim 1 further comprising a user identification input to said computer for identification of the user.

8. The video production system according to claim 7 wherein a session is displayed based upon the user identification input.

9. The video production system according to claim 8 wherein the session is selected from the group consisting of: a new session or an existing session.

10. A method for producing videos with software executing on a computer, the method comprising the steps of:
    providing a computer accessible by a user, said computer having software executing thereon for producing videos;
    inputting data related to a length of the video into said computer;
    presenting production elements on the computer to the user in a hierarchical listing;
    said user selecting from among the hierarchical listing one or more production elements;
    said software determining video production characteristics, based on the data relating to the length of the video and the selected production elements, selected from the group consisting of: total raw source video material needed to make the video, total production time required to make the video, total length of the video, delivery date to the customer for the video, total production cost to make the video, total cost to the customer for the video, and/or combinations thereof based upon the selected length and production elements;
    displaying on said computer at least one of said video production characteristics to the user; and
    said computer generating a video based on the production characteristics.

11. The method according to claim 10 further comprising the steps of making changes to the selected length of production and recalculating the video production characteristics based upon changes made to the selected length or production elements.

12. The method according to claim 11 further comprising the step of displaying the recalculated video production characteristics to the user.

13. A method for producing videos with software executing on a computer, the method comprising the steps of:
   providing a computer accessible by a user, said computer having software executing thereon for producing videos;
   inputting data relating to a price of the video into said computer;
   presenting production elements on the computer to the user in a hierarchical listing;
   said user selecting from among the hierarchical listing one or more production elements;
   said software determining video production characteristics, based on the data relating to the length of the video and the selected production elements, selected from the group consisting of: total raw source video material needed to make the video, total production time required to make the video, total length of the video, delivery date to the customer for the video, total production cost to make the video, total cost to the customer for the video, and/or combinations thereof based upon the selected price and production elements;
   displaying on said computer at least one of said video production characteristics to the user; and
   said computer generating a video based on the production characteristics.

14. The method according to claim 13 further comprising the step of recalculating the video production characteristics based upon changes made to the selected price or production elements.

15. The method according to claim 14 further comprising the step of displaying the recalculated video production characteristics to the user.

16. A method for producing videos with software executing on a computer, the method comprising the steps of:
   providing a computer accessible by a user, said computer having software executing thereon for producing videos;
   inputting data relating to at least one category for the video into said computer;
   presenting production elements on the computer to the user in a hierarchical listing;
   said user selecting from among the hierarchical listing one or more production elements;
   said software determining video production characteristics, based on the data relating to the length of the video and the selected production elements, selected from the group consisting of: total raw source video material needed to make the video, total production time required to make the video, total length of the video, delivery date to the customer for the video, total production cost to make the video, total cost to the customer for the video, and/or combinations thereof based upon the selected price and production elements;
   displaying on said computer at least one of said video production characteristics to the user; and
   said computer generating a video based on the production characteristics.

17. The method according to claim 16 further comprising the step of recalculating the video production characteristics based upon changes made to the selected at least one category or production elements.

18. The method according to claim 17 further comprising the step of displaying the recalculated video production characteristics to the user.

* * * * *